(12) United States Patent
Tang et al.

(10) Patent No.: US 12,297,838 B2
(45) Date of Patent: May 13, 2025

(54) AIR CIRCULATION APPARATUS WITH WIRE SAFETY ARRANGEMENT

(71) Applicant: Shenzhen Chenbei Technology Co., Ltd., Shenzhen (CN)

(72) Inventors: Yu Tang, Shenzhen (CN); Ruixiang Yang, Shenzhen (CN)

(73) Assignee: Shenzhen Chenbei Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/513,251

(22) Filed: Nov. 17, 2023

(65) Prior Publication Data
US 2024/0167483 A1 May 23, 2024

(30) Foreign Application Priority Data

Nov. 17, 2022 (CN) .......................... 202223089928.0

(51) Int. Cl.
| | | |
|---|---|---|
| F04D 25/06 | (2006.01) | |
| F04D 25/08 | (2006.01) | |
| F04D 17/16 | (2006.01) | |
| F04D 29/42 | (2006.01) | |
| F04D 29/62 | (2006.01) | |
| F04D 29/70 | (2006.01) | |

(52) U.S. Cl.
CPC ......... *F04D 25/0693* (2013.01); *F04D 25/08* (2013.01); *F04D 17/16* (2013.01); *F04D 29/4226* (2013.01); *F04D 29/626* (2013.01); *F04D 29/703* (2013.01)

(58) Field of Classification Search
CPC ...... F04D 25/06; F04D 25/0693; F04D 25/08; F04D 29/4226; F04D 29/703; F04D 29/626; F04D 17/16; H01R 13/44; H01R 13/5213; F24F 2013/205; F24F 7/007
USPC ............................ 415/213.1, 214.1; 439/521
See application file for complete search history.

(56) References Cited

U.S. PATENT DOCUMENTS

| | | | | |
|---|---|---|---|---|
| 2006/0290320 A1* | 12/2006 | Kim | ..................... | H04M 1/0262 320/114 |
| 2009/0238687 A1* | 9/2009 | Lin | ........................ | F04D 25/084 415/214.1 |
| 2011/0008159 A1* | 1/2011 | Masuda | ................... | F24F 7/013 415/203 |
| 2012/0107096 A1* | 5/2012 | Yang | .................... | F04D 29/4213 415/119 |

(Continued)

*Primary Examiner* — Essama Omgba
*Assistant Examiner* — Joseph S. Herrmann
(74) *Attorney, Agent, or Firm* — Trojan Law Offices

(57) ABSTRACT

A wire safety arrangement includes a wire support frame and a safety cover. The wire support frame includes a base frame, an engagement frame defining an engagement channel and a through locking slot, and a plurality of first locking members. The safety cover includes a cover body, a plurality of second locking members and a protruding member. The cover body has an upper side, a lower side, and a receiving cavity. The second locking members are provided in the receiving cavity. The protruding member protrudes from the upper side of the cover body. The safety cover is arranged to be detachably inserted in the engagement channel in such a manner that first locking members are detachably engaged with the second locking members respectively, and the protruding member is detachably engaged with the through locking slot so as to embed the main electrical wire in the receiving cavity.

16 Claims, 7 Drawing Sheets

(56) References Cited

U.S. PATENT DOCUMENTS

2019/0248406 A1* 8/2019 Kaneko .................. H02K 5/15
2021/0277904 A1* 9/2021 Chen .................... F04D 29/626

* cited by examiner

AIR CIRCULATION APPARATUS WITH WIRE SAFETY ARRANGEMENT

CROSS REFERENCE TO RELATED APPLICATION

This is a non-provisional application which claims priority to a Chinese patent application having an application number of CN202223089928.0, and a filing date of Nov. 17, 2022, the entire contents of which is hereby incorporated by reference.

BACKGROUND OF THE PRESENT INVENTION

Field of Invention

The present invention relates to an air circulation apparatus, and more particularly to an air circulation apparatus comprising a wire safety arrangement which does not utilize screws for assembling a safety cover but at the same time maintaining a widely accepted safety standards for covering the main electrical wire.

Description of Related Arts

An air circulation apparatus, which may be defined as an apparatus which utilizes rotation of fan blades to deliver air to designated space, such as a fan, a heat fan, or an air conditioning system etc., usually comprises a supporting frame, a driving motor having a driving shaft mounted on the supporting frame, a plurality of fan blades connected to the driving shaft, a control module, a main electrical wire extending through the supporting frame and connecting the driving motor to the control module, and a safety cover covering the main electrical wire. The control module is configured to control the rotation of the driving shaft so as to drive the fan blades to rotate for delivering air to the designated space for specific purposes, such as delivering cooled or heated air, or assisting dissipation of heat from the designated space.

As such, the main electrical wire may be subject to high voltage, in which the safety cover is usually designed to cover the main electrical wire and prevent users or others from accidentally come into contact with it. As a conventional safety standard, the safety cover needs to be designed in such a manner that it can only be detached from the supporting frame by the use tools. This ensures only a professional technician may be able to open the safety cover and gain access to the main electrical wire. Conventionally, this safety design requirement almost means that the safety cover is mounted on the supporting frame through some sorts of screws.

However, the disadvantage of using screws is that the relevant air circulation apparatus will have high manufacturing costs and inconvenient assembling and disassembling of the safety cover.

As a result, there is a need to develop an air circulation apparatus which does not utilize screws for assembling the safety cover but at the same time maintaining the safety requirement for covering the main electrical wire.

SUMMARY OF THE PRESENT INVENTION

Certain variations of the present invention provide an air circulation apparatus comprising a wire safety arrangement, wherein the wire safety arrangement does not utilize screws for assembling a safety cover but at the same time maintaining a widely accepted safety standards for covering the main electrical wire.

Certain variations of the present invention provide an air circulation apparatus comprising a wire safety arrangement which does not utilize screws when assembling the safety cover. However, the safety cover can only be detached from an engagement frame through the use of a specific hand tool.

In one aspect of the present invention, it provides an air circulation apparatus, comprising:
a main housing;
a driving motor mounted in the main housing;
a control module supported in the main housing;
at least one main electrical wire connecting the control module to the driving motor;
a plurality of fan blades mounted on the driving motor; and
a wire safety arrangement, which comprises:
a wire support frame provided on the main housing, the wire support frame comprising:
a base frame;
an engagement frame which is supported by the base frame and defines an engagement channel and a through locking slot, the main electrical wire extending from the control module to the driving motor through the engagement channel; and
at least one first locking member spacedly supported by the base frame; and
a safety cover, which comprises:
a cover body having an upper side, a lower side, and a receiving cavity indently formed on the lower side;
at least one second locking member provided on the safety cover in the receiving cavity; and
a protruding member protruded from the upper side of the cover body, the safety cover being arranged to be detachably inserted in the engagement channel in such a manner that the first locking member is detachably engaged with the second locking member, and the protruding member is detachably engaged with the through locking slot so as to embed the main electrical wire in the receiving cavity.

In another aspect of the present invention, it provides a wire safety arrangement for an air circulation apparatus having a main housing, a driving motor, a control module, a main electrical wire connecting the control module to the driving motor, and a plurality of fan blades, the wire safety arrangement comprising:
a wire support frame adapted for being provided on the main housing, the wire support frame comprising:
a base frame;
an engagement frame which is supported by the base frame and defines an engagement channel and a through locking slot, the main electrical wire extending from the control module to the driving motor through the engagement channel; and
at least one first locking member spacedly supported by the base frame; and
a safety cover, which comprises:
a cover body having an upper side, a lower side, and a receiving cavity indently formed on the lower side;
at least one second locking member provided on the safety cover in the receiving cavity; and
a protruding member protruded from the upper side of the cover body, the safety cover being arranged to be detachably inserted in the engagement channel in such a manner that the first locking member is detachably engaged with the second locking member, and the protruding member is detachably engaged with the through locking slot so as to embed the main electrical wire in the receiving cavity.

This summary presented above is provided merely to introduce certain concepts and not to identify any key or essential features of the claimed subject matter.

DETAILED DESCRIPTION OF THE PREFERRED EMBODIMENT

Figure 1:
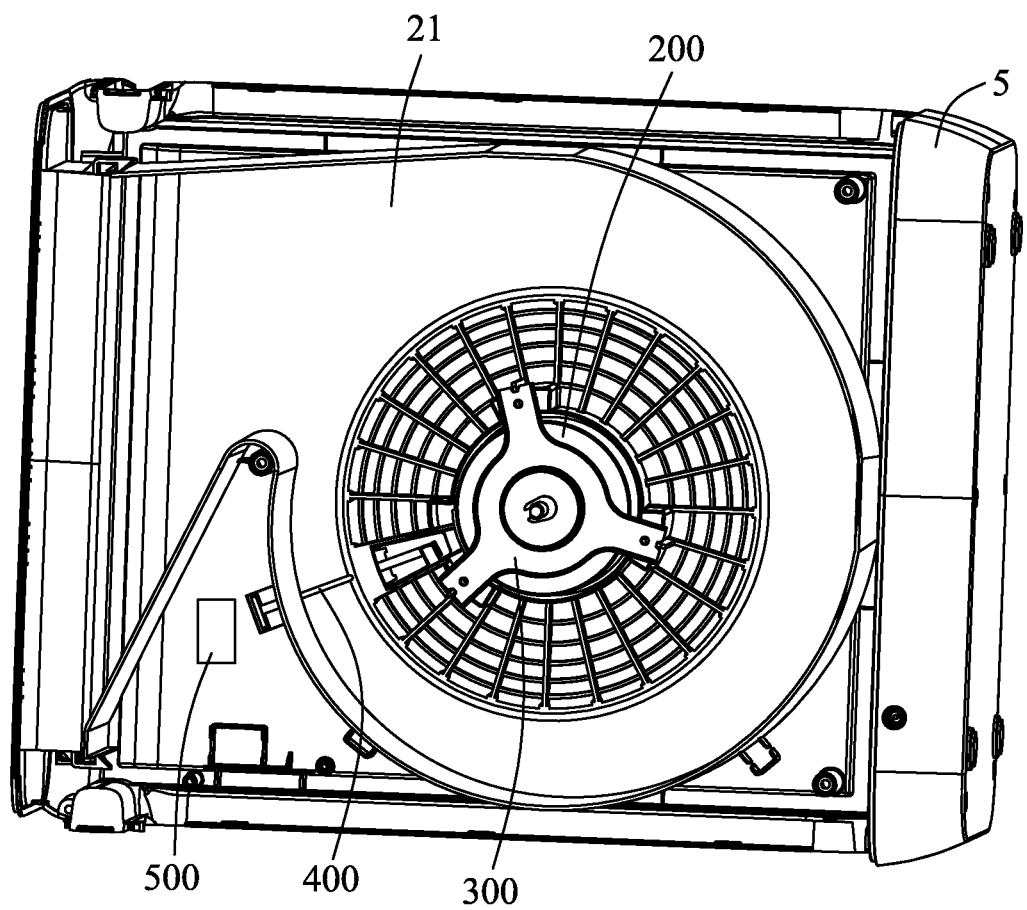
FIG. 1 is a perspective view of an air circulation apparatus according to a preferred embodiment of the present invention.

The following detailed description of the preferred embodiment is the preferred mode of carrying out the invention. The description is not to be taken in any limiting sense. It is presented for the purpose of illustrating the general principles of the present invention.

It should be appreciated that the terms "length", "width", "top", "bottom", "front", "rear", "left", "right", "vertical", "horizontal", "upper", "lower", "exterior", and "interior" in the following description refer to the orientation or positioning relationship in the accompanying drawings for easy understanding of the present invention without limiting the actual location or orientation of the present invention. Therefore, the above terms should not be an actual location limitation of the elements of the present invention.

It should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection can refer to permanent connection or detachable connection. Therefore, the above terms should not be an actual connection limitation of the elements of the present invention.

Referring to FIG. 1 to FIG. 7 of the drawings, an air circulation device according to a preferred embodiment of the present invention is illustrated. The air circulation device may be defined as an apparatus which utilizes rotation of fan blades to deliver air to designated space for specific purposes, such as a fan, a heat fan, an air conditioning system, an air purifier etc.

Broadly, the air circulation device may comprise a main housing 5, a driving motor 200 mounted in the main housing 5 with a motor mount 300, a control module 500 supported in the main housing 5, at least one main electrical wire 400 connecting the control module 500 to the driving motor 200, and a wire safety arrangement 100. The purpose of the wire safety arrangement 100 is to protect and conceal the main electrical wire 400 so that the main electrical wire 400 will not be easily accessible and exposed to users of the air circulation device while it is in use.

The wire safety arrangement 100 may comprise a wire support frame 2, a plurality of (but at least one) first locking members 23, and a safety cover 1. The wire support frame 2 may be provided on the main housing 5, and may comprise a base frame 21 and an engagement frame 22. The base frame 21 may have a wire inlet slot 215. The engagement frame 22 may be supported by the base frame 21 and defines an engagement channel 223 and a through locking slot 2211, wherein the main electrical wire 400 may extend from the control module 500 to the driving motor 200 through the engagement channel 223. In addition, the plurality of first locking members 23 may be spacedly supported by the base frame 21.

The safety cover 1 may comprise a cover body 11, a plurality of (but at least one) second locking members 114, and a protruding member 1211. The cover body 11 may have an upper side 116, a lower side 117, and a receiving cavity 118 indently formed on the lower side 117.

The plurality of second locking members 114 may be provided on the safety cover 1 in the receiving cavity 118.

The protruding member 1211 may protrude from the upper side 116 of the cover body 11. The safety cover 1 may be arranged to be detachably inserted in the engagement channel 223 in such a manner that the first locking members 23 may be detachably engaged with the second locking members 114 respectively, and the protruding member 1211 is detachably engaged with the through locking slot 2211 so as to embed the main electrical wire 400 in the receiving cavity 118.

According to the preferred embodiment of the present invention, the wire support frame 2 may be provided on the main housing 5 for supporting the main electrical wire 400, which may extend from the control module 500 to the driving motor 200. The main electrical wire 400 may supply power to the driving motor 200 and subject to high voltage. The wire support frame 2 may have a plurality of ventilating slots 2123 for allowing air driven by fan blades (not shown) to be delivered through the ventilating slots 2123.

Figure 2:
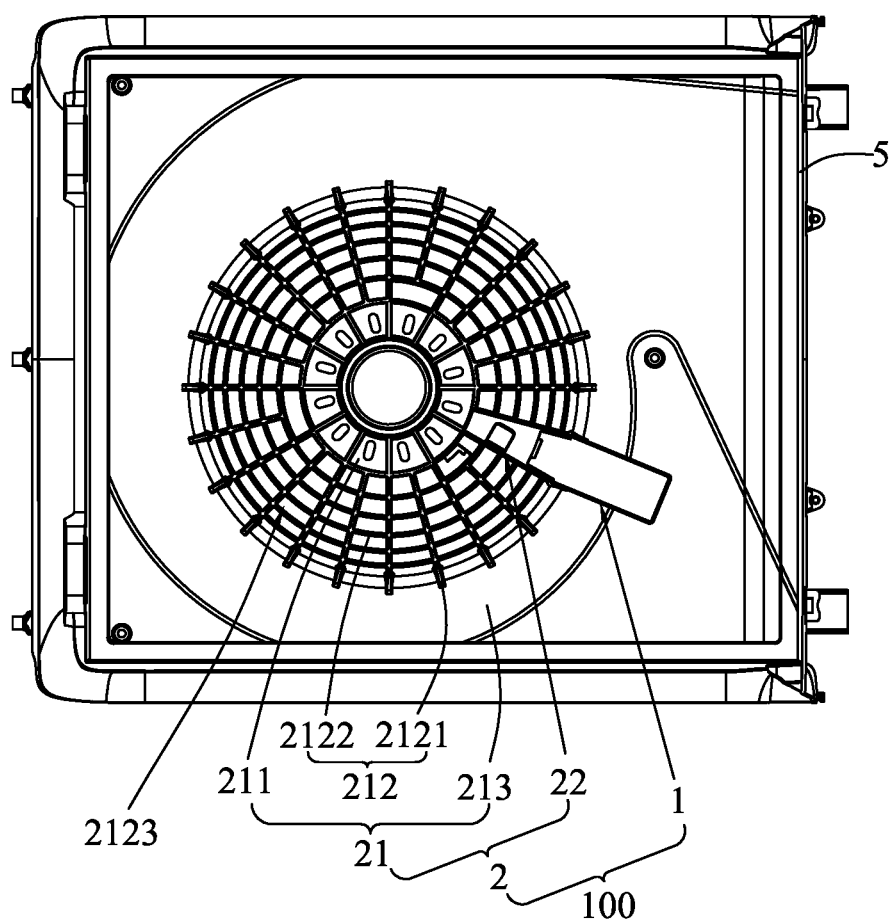
FIG. 2 is a schematic diagram of the air circulation apparatus according to the preferred embodiment of the present invention.

Referring to FIG. 2 of the drawings, the base frame 21 may have an installation portion 211 having a circular cross section, a ventilating portion 212 and a peripheral portion 213. The ventilating portion 212 may peripherally extend from the installation portion 211, and the peripheral portion 213 may extend from the ventilating portion 212. The driving motor 200 and the fan blades may be mounted on the installation portion 211. The ventilating slots 2123 may be formed on the ventilating portion 212. The cover body 11 may be supported on the peripheral portion 213.

The ventilating portion 212 may have a plurality of first extension rods 2121 radially extending between the installation portion 211 and the peripheral portion 213, and a plurality of second extension rods 2122 circumferentially and spacedly extending across the first extension rods 2121 to form the plurality of ventilating slots 2123.

Figure 5:
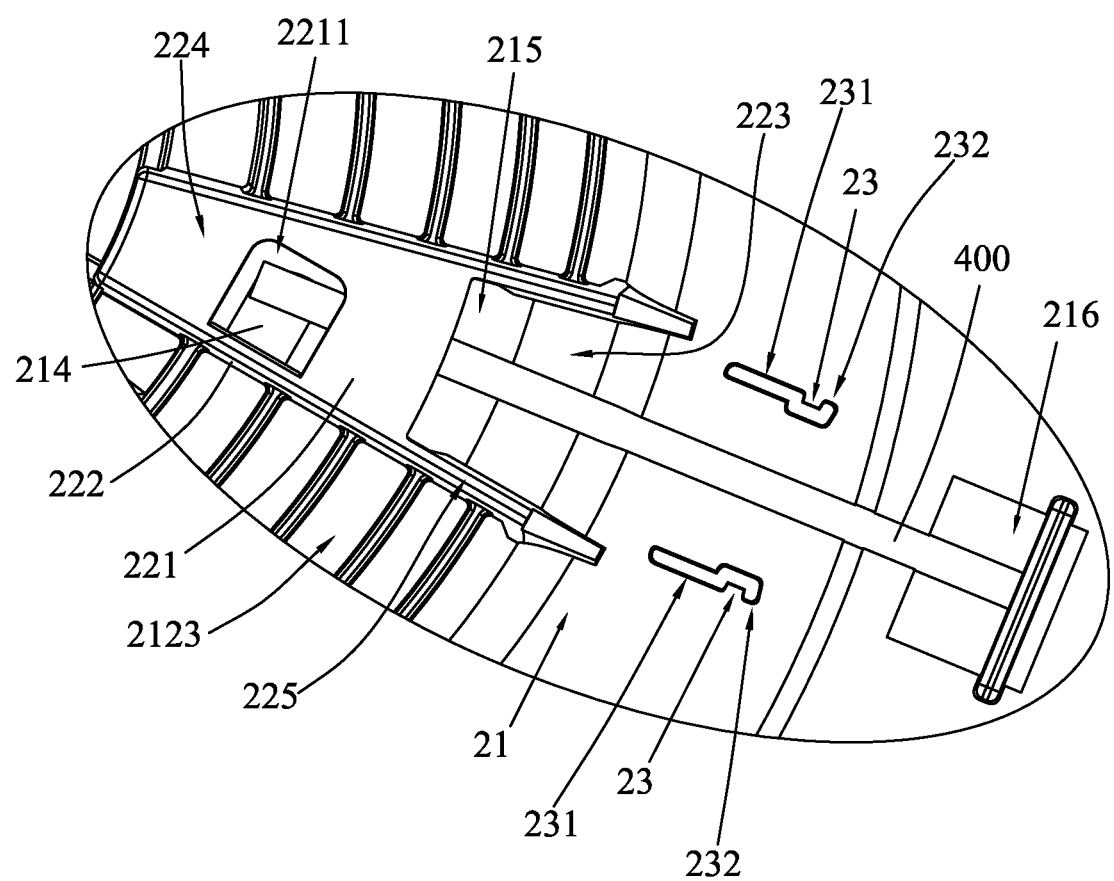
FIG. 5 is another schematic diagram of the wire safety arrangement of the air circulation apparatus according to the preferred embodiment of the present invention.

As shown in FIG. 5 of the drawings, the base frame 21 may have a wire inlet slot 215 which may allow the main electrical wire 400 to pass through. The wire inlet slot 215 may be formed underneath the engagement frame 22. The base frame 21 may further have a wire outlet slot 216 wherein the main electrical wire 400 may extend from the control module 500 to the driving motor 200 by sequentially extending through the wire outlet slot 216, the engagement channel 223, and the wire inlet slot 215.

Figure 4:
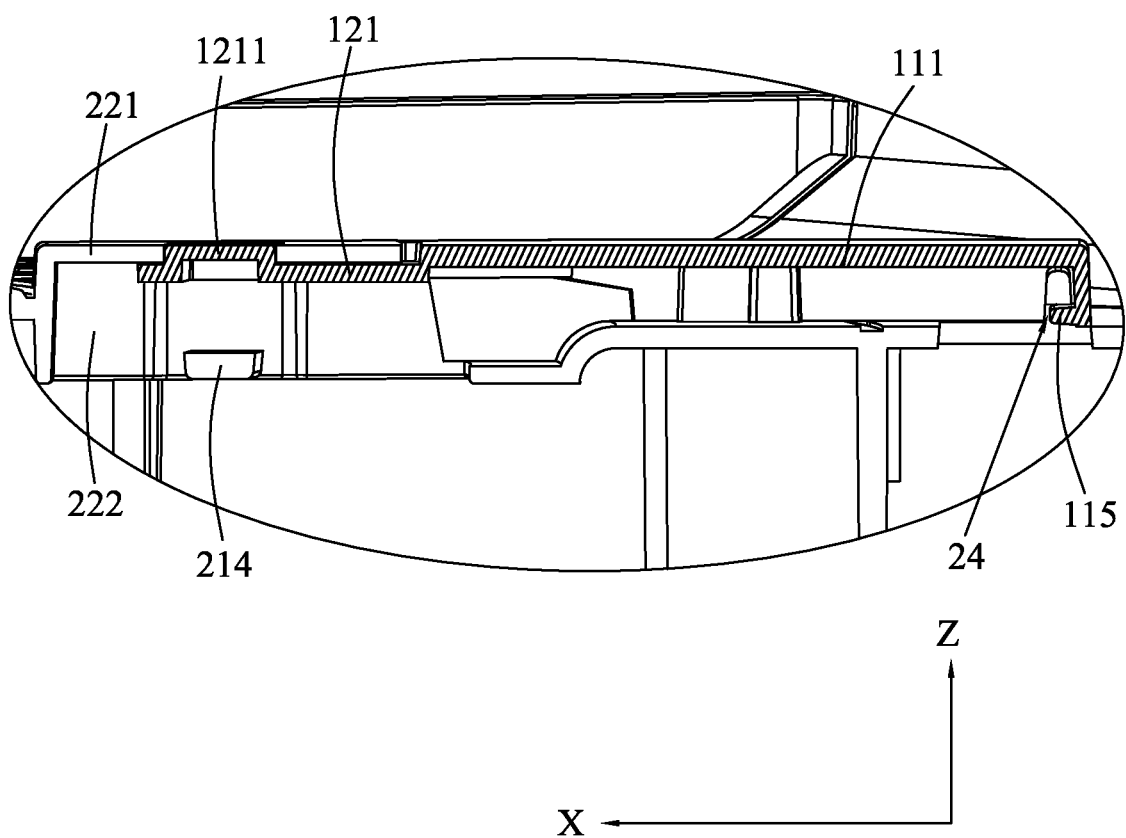
FIG. 4 is a sectional side view of the wire safety arrangement of the air circulation apparatus according to the preferred embodiment of the present invention.

As shown in FIG. 4 to FIG. 5 of the drawings, the engagement frame 22 may be mounted on the base frame 21 at a position on top of the wire inlet slot 215. The engagement frame 22 may have an elongated structure and may comprise a top panel 221, and two side panels 222 downwardly extending from two opposite sides of the top panel 221 respectively. The side panels 222 may extend between the top panel 221 and the base frame 21 so as to form an engagement channel 223 as the space surrounded by the top panel 221 and the side panels 222, wherein the safety cover 1 may be partially inserted in engagement channel 223 (described in more detail below).

Figure 3:
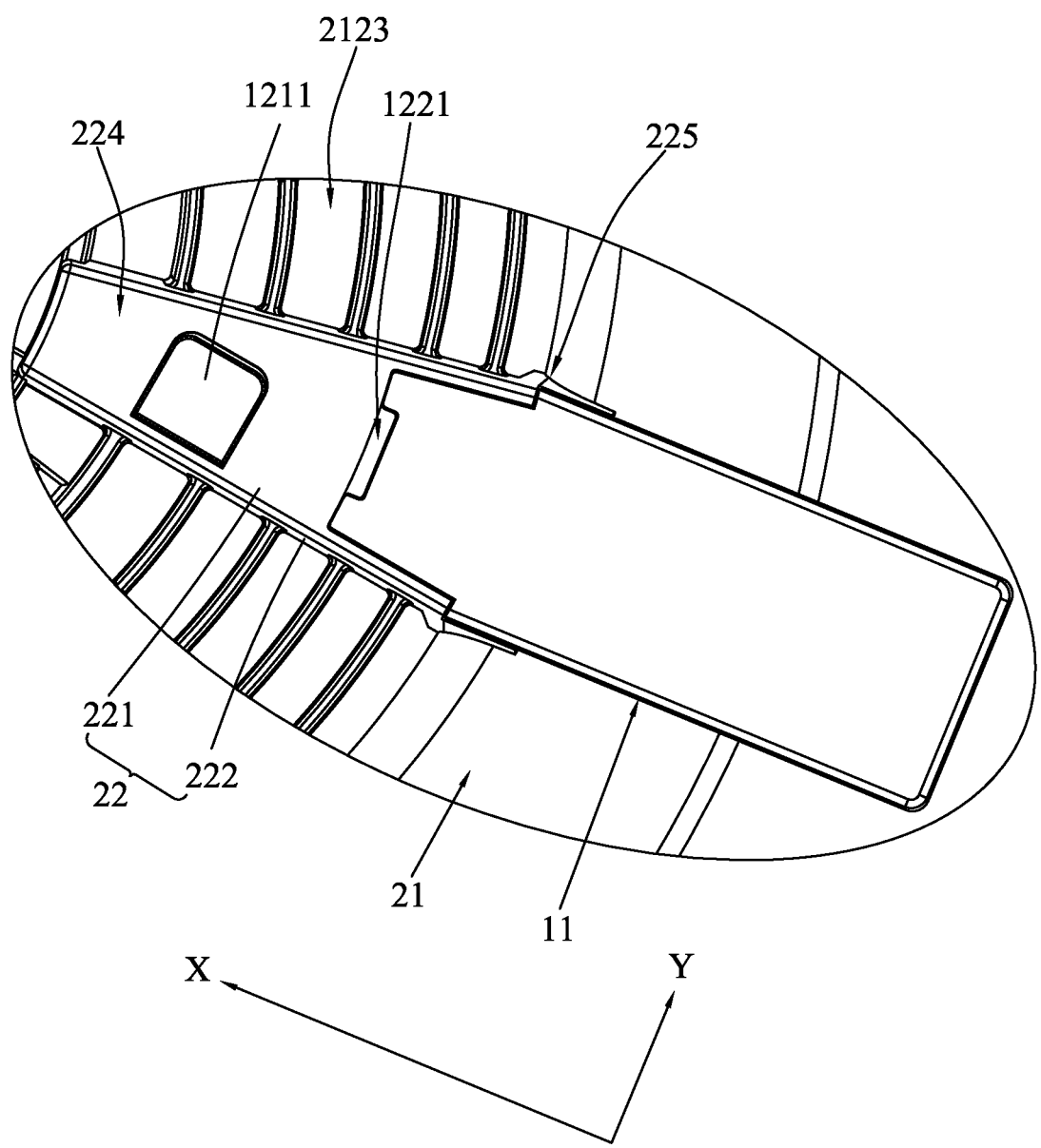
FIG. 3 is a schematic diagram of a wire safety arrangement of the air circulation apparatus according to the preferred embodiment of the present invention.

With reference to FIGS. 3 to 5 of the drawings, the top panel 221 and the base frame 21 may be spacedly provided along Z-direction. Each of the side panels 222 may extend along X-direction which forms a longitudinal direction of the engagement frame 22. The transverse direction of the engagement frame 22 may extend along Y-direction as illustrated in FIG. 3 of the drawings. X-direction and Y-direction are perpendicular to each other.

The engagement frame 22 may define the through locking slot 2211 on the top panel 221 so that a user may be able to access the engagement channel 223 through the through locking slot 2211. In other words, the through locking slot 2211 may communicate the engagement channel 223 with an exterior of the engagement frame 22.

The base frame 21 may further comprise a securing panel 214 extending underneath the top panel 221 at a position corresponding to the through locking slot 2211 for restricting a position of the main electrical wire 400 which may pass underneath the through locking slot 2211.

As shown in FIG. 5 of the drawings, the engagement frame 22 may have an inner portion 224, and an outer portion 225, wherein a width of the top panel 221 may gradually increase from the inner portion 224 toward the outer portion 225 so as to form a trapezial cross section shape when viewed in direction towards the top panel 221. On the other hand, each of the side panels 222 may on the base frame 21 to correspond to the side edges of the top panel 221. A longitudinal length of each of the side panels 222 may be longer than that of the top panel 221.

In this preferred embodiment, the wire support frame 2 may comprise two first locking members 23 spacedly provided on the base frame 21 at positions in vicinity of the outer portion 225 of the engagement frame 22. Each of the first locking members 23 may have an elongated and ridge-like structure. The first locking member 23 may extend on the base frame 21 along and substantially parallel to the longitudinal directions of the two side panels 222 respectively.

Each of the first locking members 23 may have an extension portion 231 and a hook-like elastic portion 232 configured to have a hook-like structure which may possess a predetermined degree of elasticity. The elastic portions 232 may slightly move along a transverse direction thereof for detachably engaging with the second locking members 114 respectively. The first locking members 23 may be provided between the engagement frame 22 and the wire outlet slot 216.

It is worth mentioning that the number and positions of the first locking members 23 and the second locking members 114 may be varied. For example, the wire safety arrangement 100 may comprise only one first locking member 23 and the safety cover 1 may comprise only one second locking member 114 at a position corresponding to the first locking member 23.

Figure 7:
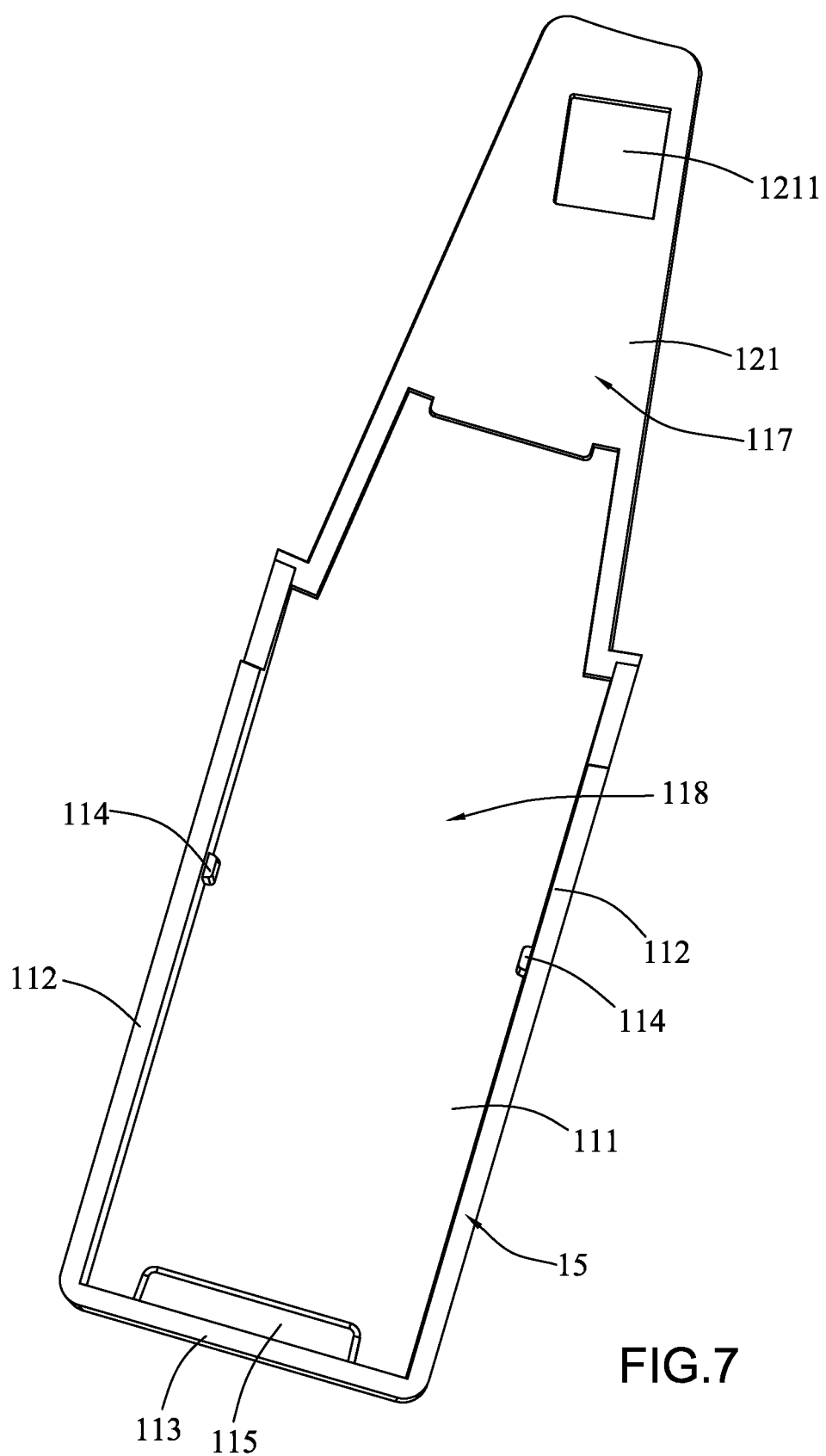
FIG. 7 is a bottom perspective view of the safety cover of the wire safety arrangement of the air circulation apparatus according to the preferred embodiment of the present invention.

The safety cover 1 may be detachably inserted in the engagement channel 223 so as to detachably engage with the engagement frame 22 for substantially concealing the main electrical wire 400. As shown in FIG. 3 and FIG. 7 of the drawings, the safety cover 1 may be shaped and sized to correspond to the engagement frame 22 so as to allow the safety cover 1 to be fittedly engaged in the engagement channel 223. In practice, the safety cover 1 may be partially inserted into the space between the two side panels 222 of the engagement frame 22.

More specifically, the cover body 11 of the safety cover 1 may have a front insertion portion 12 and a main portion 15 extending from the front insertion portion 12. According to the preferred embodiment of the present invention, the front insertion portion 12 may be arranged to be detachably inserted in the engagement channel 223, while the main portion 15 may extend from the engagement channel 223 and detachably engaged with the first locking members 23.

As shown in FIG. 3, FIG. 4 and FIG. 7 of the drawings, the cover body 11 may comprise a main panel 111, a peripheral panel 112 and an end panel 113. The main panel 111 may extend through the main portion 15 and the front insertion portion 12, wherein the peripheral panel 112 may peripherally and downwardly extend from the main panel 111 at the main portion 15 of the cover body 11, and the end panel 113 may extend between the two peripheral panel 112 along a transverse direction of the cover body 11 at a rear end thereof.

Figure 6:
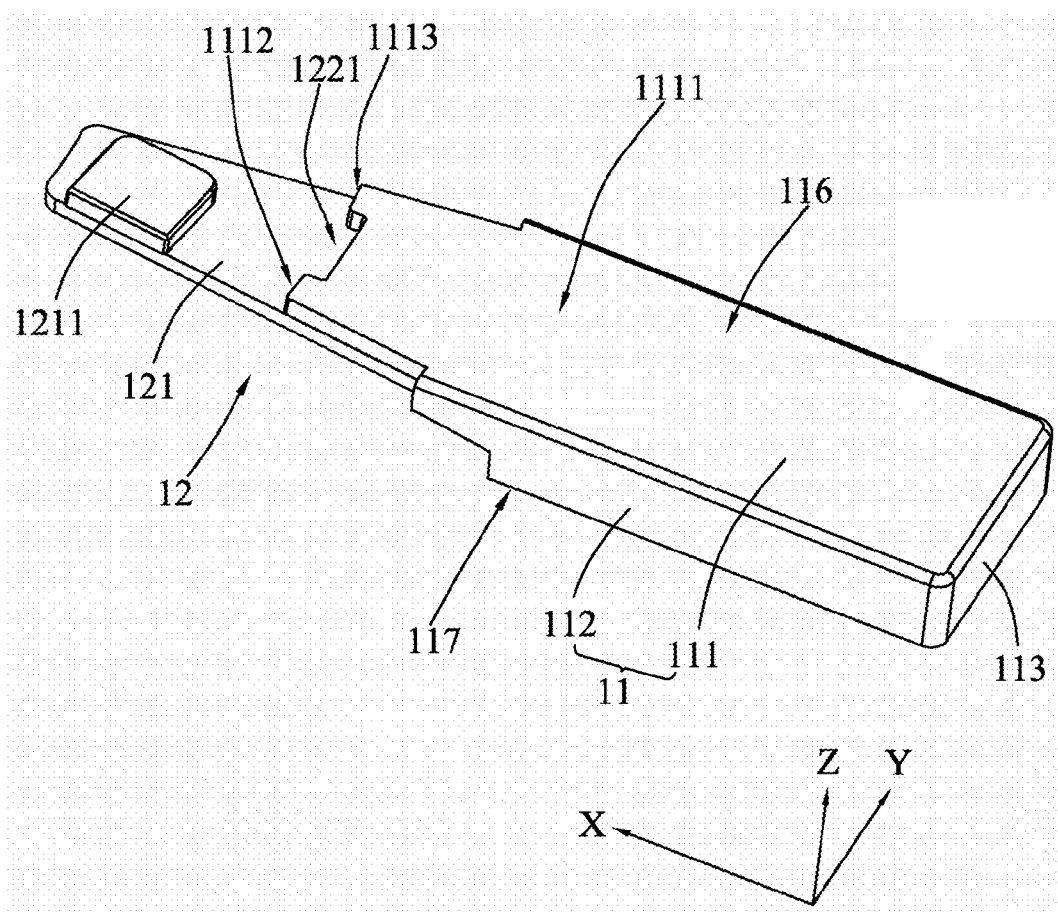
FIG. 6 is a top perspective view of the safety cover of the wire safety arrangement of the air circulation apparatus according to the preferred embodiment of the present invention.

As shown in FIG. 4 and FIG. 6 of the drawings, the main panel 111 may be divided into a main section 1111 and an insertion section 121 extending underneath the main section 1111 in a direction opposite the end panel 113, wherein the protruding member 1211 may protrude from the insertion section 121. The insertion section 121 and an adjacent part of the main panel 111 may constitute the front insertion portion 12 of the safety cover 1. The insertion section 121 may be provided and extend from underneath the main section 1111 so as to create a step structure and a biasing shoulder 1112 on the front insertion portion 12. The biasing shoulder 1112 may be formed at the intersection between the main section 1111 and the insertion section 121.

As described in more details below, the insertion section 121 may be arranged to be inserted underneath the top panel 221 of the base frame 21 when the safety cover 1 may be detachably engaged with the engagement frame 22. When the safety cover 1 is detachably engaged with the engagement frame 22, the biasing shoulder 1112 may be arranged to bias against the top panel 221 so that the safety cover 1 is prevented from inserting further in the engagement channel 223. Moreover, a position of the insertion section 121 may also be restricted by the side panels 222 of the engagement frame 22. Thus, a transverse width of the front insertion portion 12 may gradually increase from the front and may correspond to the transverse width of the engagement channel 223 as defined by the distance between the two side panels 222 of the engagement frame 22. As a result, the side panels 222 may guide the insertion of the insertion section 121 to slide in the engagement channel 223.

As shown in FIG. 7 of the drawings, the receiving cavity 118 of the safety cover 1 may be formed at a lower side 117 thereof. The receiving cavity 118 may be formed as the space surrounded by the main panel 111, the peripheral panels 112, and the end panel 113. The second locking members 114 may protrude from the peripheral panels 112 at positions corresponding to the first locking members 23 respectively. Each of the second locking members 114 may be configured as a protruding ridge which is arranged to engage with the elastic portion 232 of the corresponding first locking member 23. The second locking members 114 may protrude from the peripheral panels 112 along Y-direction as illustrated in FIG. 3 of the drawings. X-direction and Y-direction may be perpendicular to each other. X-direction may illustrate a longitudinal direction of the cover body 11, and Y-direction may illustrate a transverse direction of the cover body 11.

It is worth mentioning that for the sake of manufacturing procedure, the cover body 11 may be formed as a single integral body so that the main panel 111, the peripheral panel 112, the end panel 113, the main section 1111, the insertion section 121, and the protruding member 1211 may form an integral structure.

Moreover, the cover body 11 may further have an indention 1221 indently formed on a front edge 1113 of the main panel 111 at the front insertion portion 12 of the safety cover 1, wherein when the safety cover 1 is engaged with the engagement frame 22, a user may be able to detach the safety cover 1 from the engagement frame 22 by inserting a hand tool in the indention 1221.

According to the preferred embodiment of the present invention, the insertion section 121 may have a predetermined elasticity in Z-direction so that it may slightly deform by the application of external force. The insertion section 121 may be arranged to insert underneath the top panel 221 in such a manner that the protruding member 1211 is arranged to engage with the through locking slot 2211 of the top panel 221 in Z-direction as illustrated in FIG. 4 of the drawings. Z-direction may be perpendicular to the plane constituted by X-direction and Y-direction (i.e. X-Y plane). This arrangement may facilitate easy detachment of the safety cover 1 when a user insert a hand tool in the indention 1221 because the user may simply need to slightly depress the protruding member 1211 for releasing the locking effect of the protruding member 1211.

As a result, the safety cover 1 may be secured in position by the engagement between the first locking members 23 and the second locking members 114, and between the protruding member 1211 and the through locking slot 2211. Transverse displacement of the safety cover 1 may be restricted by the two side panels 222 of the engagement frame 22. Moreover, at least part of the insertion section 121 may bias against a bottom surface of the top panel 221 for further restricting a movement of the cover body 11 in Z-direction.

Referring to FIG. 4 and FIG. 7 of the drawings, the safety cover 1 may further comprise a first engaging member 115 provided on the end panel 113 and extend in the receiving cavity 118, while the base frame 21 may further comprise a second engaging member 24 provided on the base frame 21 at a position corresponding to the first engaging member 115. When the safety cover 1 is inserted in the engagement channel 223, the first engaging member 115 may detachably engage with the second engaging member 24. This arrangement may allow a far end (the end portion away from the engagement channel 223) of the safety cover 1 to be secured in position on the base frame 21. The first engaging member 115 may be configured as a hook and the second engaging member 24 may be configured as a slot. This configuration may be interchanged. In other words, the first engaging member 115 may be configured as a slot and the second engaging member 24 may be configured as a hook. In other words, the first engaging member 115 and the second engaging member 24 may form a hook and slot engagement.

The operation of the present invention may be described as follows: the main electrical wire 400 may extend from the control module 500 to the driving motor 200. The main electrical wire 400 may pass through the wire inlet slot 215 and the wire outlet slot 216 and extend on the wire support frame 2. The purpose of the safety cover 1 is to conceal the exposed portion of the main electrical wire 400 on the wire support frame 2. The front insertion portion 12 may be slid in the engagement channel 223 so as to detachably engage the cover body 11 with the engagement frame 22 in X-direction as illustrated in FIG. 3 of the drawings. The cover body 11 may then extend out of the engagement channel 223 and cover the base frame over the area between the wire inlet slot 215 and the wire outlet slot 216 so as to conceal the main electrical wire 400 in the receiving cavity 118.

The second locking members 114 may detachably engage with the first locking members 23 respectively. Moreover, when the safety cover 1 is detachably engaged with the engagement frame 22, the biasing shoulder 1112 may be arranged to bias against the top panel 221. The engagement of the safety cover 1 and the engagement frame 22 may simply be accomplished by manually pushing the cover body 11 on the wire support frame 2 until the front insertion portion 12 is slid in the engagement channel 223 so that the biasing shoulder 1112 biases against the top panel 221 and at the same time, the second locking members 114 are detachably engaged with the first locking members 23 respectively. The protruding member 1211 may also be engaged with the through locking slot 2211. These engagement processes do not involve the use of any hand tools and screws. Thus, the present invention may substantially simplify the engagement between the safety cover 1 and the base frame 21 and prevents the use of any screws, thus minimizing the manufacturing cost of the present invention.

Since the front insertion portion 12 may have a predetermined elasticity, when the cover body 11 is pushed further down the engagement channel 223, the front insertion portion 12 and the protruding member 1211 may be pushed underneath the top panel 221, and there will be a point where the protruding member 1211 meets the through locking slot 2211 and when that happens, the protruding member 1211 will be pushed to pass through the through locking slot 2211 due to the inherent elasticity possessed by the front insertion portion 12. This engagement may produce a sound and a "click" feeling to indicate that the engagement between the protruding member 1211 and the through locking slot 2211 is successful. At this time, the protruding member 1211 may penetrate through the through locking slot 2211.

It is worth mentioning that when the cover body 11 is engaged in the engagement channel 223, a user is not able to manually pull the cover body 11 out from the engagement channel 223 because of the various engagement mechanisms as described above. More specifically, a user will not be able to exert force along X-direction to pull out the cover body 11 because of tight interlocking between the first locking members 23 and the second locking member 114, and between the protruding member 1211 and the through locking slot 2211. Moreover, a user will not be able to release the locking by exerting force along Y-direction because the second locking members 114 are concealed in the receiving cavity 118. In other words, a user will not be able to detach the safety cover 1 from the wire support frame 2 without using any hand tools.

When the safety cover 1 needs to be detached from the engagement frame 22, a user needs to manually depress the protruding member 1211 until the locking between the protruding member 1211 and the through locking slot 2211 is released (i.e. the protruding member 1211 is moved to be underneath the base frame 21). At the same time, the user needs to manually grab the cover body 11 and at the same time use a hand tool and insert it in the indention 1221 and exert force in X-direction and away from the engagement channel 223. The user may then manually pull the cover body 11 out of the engagement channel 223 along X-direction (i.e. the longitudinal direction of the cover body 11) because the hand tool provides sufficient force to overcome the interlocking between the first locking member 23 and the second locking members 114.

It is worth mentioning that since the indention 1221 is formed on the biasing shoulder 1112, when the hand tool is inserted in the indention 1221, the force exerted by the hand tool may be effectively and directly transmitted to the main panel 111 so as to allow the user to efficiently, effectively yet conveniently pull the cover body 11 out of the engagement channel 223.

The present invention, while illustrated and described in terms of a preferred embodiment and several alternatives, is not limited to the particular description contained in this specification. Additional alternative or equivalent components could also be used to practice the present invention.

What is claimed is:

1. An air circulation apparatus, comprising:
a main housing;
a driving motor and a control module mounted in the main housing;
at least one main electrical wire connecting the control module to the driving motor; and
a wire safety arrangement, which comprises:
a wire support frame provided on the main housing, the wire support frame comprising:
a base frame;
an engagement frame which is supported by the base frame and defines an engagement channel, the at least one main electrical wire extending through the engagement channel; and
at least one first locking member supported by the base frame; and
a safety cover, which comprises:
a cover body having an upper side, a lower side, and a receiving cavity indently formed on the lower side;
at least one second locking member provided in the receiving cavity;
the safety cover being arranged to be detachably inserted in the engagement channel in such a manner that the at least one first locking member is detachably engaged with the at least one second locking member so as to embed the at least one main electrical wire in the receiving cavity;
wherein the engagement frame comprises a top panel, and two side panels downwardly extending from two opposite sides of the top panel respectively, the two side panels each extend between the top panel and the base frame to form the engagement channel, defined as a space surrounded by the top panel and the two side panels, wherein the safety cover is partially inserted in the engagement channel; and
wherein the engagement frame further defines a through locking slot, the safety cover further comprising a protruding member protruded from the upper side of the cover body to detachably engage with the through locking slot when the safety cover being arranged to be detachably inserted in the engagement channel.

2. The air circulation apparatus, as recited in claim 1, wherein the engagement frame has an inner portion, and an outer portion, wherein a width of the top panel gradually increases from the inner portion toward the outer portion so as to form a trapezial cross sectional shape when viewed in a direction towards the top panel, the two side panels extending on the base frame at a direction corresponding to the side edges of the top panel respectively.

3. The air circulation apparatus, as recited in claim 1, wherein the cover body of the safety cover has a front insertion portion and a main portion extending from the front insertion portion, wherein the front insertion portion is arranged to be detachably inserted in the engagement channel, while the main portion extends from the engagement channel and is detachably engaged with the at least one first locking member.

4. The air circulation apparatus, as recited in claim 3, wherein the cover body comprises a main panel, a peripheral panel, and an end panel, the main panel extending through the main portion and the front insertion portion, the peripheral panel peripherally and downwardly extending from the main panel at the main portion of the cover body, the end panel extending from the peripheral panel along a transverse direction of the cover body at a rear end thereof.

5. The air circulation apparatus, as recited in claim 4, wherein the safety cover further comprises a first engaging member provided on the end panel and extended in the receiving cavity, while the base frame further comprise a second engaging member provided on the base frame at a position corresponding to the first engaging member, wherein when the safety cover is inserted in the engagement channel, the first engaging member is arranged to detachably engage with the second engaging member.

6. The air circulation apparatus, as recited in claim 5, wherein the main panel is divided into a main section and an insertion section extending underneath the main section in a direction opposite the end panel, wherein a protruding member protrudes from the insertion section, the insertion section extending from underneath the main section so as to create a step structure and a biasing shoulder on the front insertion portion, the biasing shoulder being formed at an intersection between the main section and the insertion section, the insertion section being arranged to be inserted underneath a top panel of the base frame when the safety cover is detachably engaged with the engagement frame, the biasing shoulder being arranged to bias against the top panel.

7. The air circulation apparatus, as recited in claim 3, wherein the cover body further has an indention indently formed on a front edge of the front insertion portion of the safety cover for allowing a user to insert a hand tool to detach the safety cover from the engagement frame.

8. The air circulation apparatus, as recited in claim 1, wherein the at least one first locking member has an extension portion and at least one elastic portion configured to have a hook-like structure and possesses a predetermined degree of elasticity, the at least one elastic portion being slightly movable along a transverse direction thereof for detachably engaging with the at least one second locking member.

9. A wire safety arrangement for an air circulation apparatus having a main housing, a driving motor, a control module, a main electrical wire connecting the control module to the driving motor, the wire safety arrangement comprising:

a wire support frame provided on the main housing, the wire support frame comprising:

a base frame;

an engagement frame which is supported by the base frame and defines an engagement channel, the main electrical wire extending through the engagement channel; and at least one first locking member supported by the base frame; and a safety cover, which comprises:

a cover body having an upper side, a lower side, and a receiving cavity indently formed on the lower side;

at least one second locking member provided in the receiving cavity;

the safety cover being arranged to be detachably inserted in the engagement channel in such a manner that the at least one first locking member is detachably engaged with the at least one second locking member so as to embed the main electrical wire in the receiving cavity;

wherein the engagement frame comprises a top panel, and two side panels downwardly extending from two opposite sides of the top panel respectively, the two side panels each extend between the top panel and the base frame to form the engagement channel, defined as a space surrounded by the top panel and the two side panels, wherein the safety cover is partially inserted in the engagement channel; and wherein the engagement frame further defines a through locking slot, the safety cover further comprising a protruding member protruded from the upper side of the cover body to detachably engage with the through locking slot when the safety cover being arranged to be detachably inserted in the engagement channel.

10. The wire safety arrangement, as recited in claim 9, wherein the engagement frame has an inner portion, and an outer portion, wherein a width of the top panel gradually increases from the inner portion toward the outer portion so as to form a trapezial cross sectional shape when viewed in a direction towards the top panel, the two side panels extending on the base frame at a direction corresponding to the side edges of the top panel respectively, a longitudinal length of each of the two side panels being longer than a longitudinal length of the top panel.

11. The wire safety arrangement, as recited in claim 9, wherein the cover body of the safety cover has a front insertion portion and a main portion extending from the front insertion portion, wherein the front insertion portion is arranged to be detachably inserted in the engagement channel, while the main portion extends from the engagement channel and is detachably engaged with the at least one first locking member.

12. The wire safety arrangement, as recited in claim 11, wherein the cover body comprises a main panel, a peripheral panel, and an end panel, the main panel extending through the main portion and the front insertion portion, the peripheral panel peripherally and downwardly extending from the main panel at the main portion of the cover body, the end panel extending from the peripheral panel along a transverse direction of the cover body at a rear end thereof.

13. The air circulation apparatus, as recited in claim 12, wherein the safety cover further comprises a first engaging member provided on the end panel and extended in the receiving cavity, while the base frame further comprise a second engaging member provided on the base frame at a position corresponding to the first engaging member, wherein when the safety cover is inserted in the engagement channel, the first engaging member is arranged to detachably engage with the second engaging member.

14. The wire safety arrangement, as recited in claim 12, wherein the main panel is divided into a main section and an insertion section extending underneath the main section in a direction opposite the end panel, wherein a protruding member protrudes from the insertion section, the insertion section extending from underneath the main section so as to create a step structure and a biasing shoulder on the front insertion portion, the biasing shoulder being formed at an intersection between the main section and the insertion section, the insertion section being arranged to be inserted underneath a top panel of the base frame when the safety cover is detachably engaged with the engagement frame, the biasing shoulder being arranged to bias against the top panel.

15. The wire safety arrangement, as recited in claim 11, wherein the cover body further has an indention indently formed on a front edge of the front insertion portion of the safety cover for allowing a user to insert a hand tool to detach the safety cover from the engagement frame.

16. The wire safety arrangement, as recited in claim 9, wherein the at least one first locking member has an extension portion and at least one elastic portion configured to have a hooklike structure and possesses a predetermined degree of elasticity, the at least one elastic portion being slightly movable along a transverse direction thereof for detachably engaging with the at least one second locking member.

* * * * *